United States Patent
Sharaf et al.

[15] 3,676,770
[45] July 11, 1972

[54] PULSE SAMPLING BATTERY FUEL GAUGING AND RESISTANCE METERING METHOD AND MEANS

[72] Inventors: Harold M. Sharaf, Milton; Richard L. Eby, South Weymouth, both of Mass.

[73] Assignee: Anderson Power Products, Inc., Boston, Mass.

[22] Filed: May 15, 1970

[21] Appl. No.: 37,630

[52] U.S. Cl. ............................ 324/29.5, 324/62, 320/43, 320/48
[51] Int. Cl. ........................................................ G01n 27/46
[58] Field of Search ............... 324/29.5, 62, 133; 320/21, 320/29, 32, 39, 43, 48

[56] References Cited

UNITED STATES PATENTS 2,654,865  10/1953  Klug .......................... 324/29.5 X
3,405,352  10/1968  Wondra ....................... 324/29.5

Primary Examiner—Robert J. Corcoran
Attorney—Chittick, Pfund, Birch, Samuels & Gauthier

[57] ABSTRACT

A continuously operating low dissipation system for sensing the electrical resistance of an element while the element carries a normal operating current. A pulse of electrical energy having a regulated ohm's law related first parameter is switched through the element while a second ohm's law related parameter of the element's response to the energy pulse is simultaneously measured. These two known parameters provide the information necessary to determine the element's resistance using Ohm's law. In the preferred embodiment voltage and current are used as the two parameters. The system is calibrated for the regulated level of the first parameter while the second parameter is amplified and stored in a sampling circuit for continuous display between pulses as an indication of resistance. The pulse techniques of this disclosure allow continuous operation of the system without heating of the resistive element or excessive power use. The resistance indication is additionally useful for indicating the remaining charge in a battery where the indicated resistance is the battery's internal resistance. A distinct battery terminal voltage indication is also given.

12 Claims, 6 Drawing Figures

INVENTORS
HAROLD M. SHARAF
RICHARD L. EBY

ATTORNEYS

PULSE SAMPLING BATTERY FUEL GAUGING AND RESISTANCE METERING METHOD AND MEANS

BACKGROUND OF THE INVENTION

There are many applications today for a system to continuously monitor the resistance of a very low resistance electrical element while the element is in normal operation in a circuit. The monitoring must be accomplished without substantially heating the element or using a large amount of power. Two applications where continuous low dissipation monitoring are desirable are the measurement of electrical contact resistance and the measurement of internal battery resistance.

Small changes in the contact resistance of electrical switches and connectors, particularly those carrying high current, can create severe problems in the circuits in which they are used. Because the resistance of such contacts is typically very low, in the micro-ohm range, high test currents must be passed through these contacts to generate accurately detectable voltages which can be used to indicate the contact resistance. These high currents can generate substantial heat in the contacts and other parts of the measuring circuit as well as requiring that large amounts of power be supplied by the measuring system.

Many commercial vehicles such as forklift trucks operate electrically off a stack of batteries. It is crucial to the economical operation of these vehicles to predict how much charge remains in the batteries substantially in advance of their discharge. This information must be supplied continuously without the need for interrupting the normal work of the vehicle. Such a measurement can be based on the batteries' internal resistance during the last portion of their discharge and the resistance can be used as an indication of the batteries' charge remaining.

It is thus a general object of this invention to provide for the continuous monitoring of the resistance of an electrical element while that element is in normal circuit use.

It is a specific object of this invention to continuously monitor very low resistance without generating substantial heat or consuming excessive power.

It is a further specific object of this invention to provide a device which measures the internal resistance of an electrical battery while in operation and which device uses the measured resistance to indicate the remaining battery charge.

It is a further specific object of this invention to continuously display battery charge or voltage information in an accurate, unambiguous and meaningful manner.

SUMMARY OF THE INVENTION

These and other objects of this invention are accomplished in its preferred embodiment by means in a measuring circuit which causes a pulse of energy having a regulated Ohm's law related first parameter to flow through an element whose resistance is to be measured. A monitor in the measuring circuit generates a feedback signal which maintains the regulation of the first parameter during the pulse. A second parameter characteristic of the Ohm's law response of the element to the energy pulse is sensed and amplified to a useful level. In the preferred embodiment voltage and current are used as the first and second pulse parameters. Either voltage or current can be selected as the first parameter. Sample and hold means is activated coincident with the energy pulse to sample and hold the amplified signal representative of the second parameter. Where the element is part of a further circuit and operates in an ambient condition in the further circuit, the amplified signal as sampled and held represents the difference in the second parameter between the pulse and adjacent ambient state responses. The sampled and held signal is outputted through an output means which can include a meter indication of the resistance value or of its relation to a preset resistance value. Alarm, control or recording devices may also be added to the output means.

The pulse of energy is produced by a controllable switch driven by a power amplifier that is in turn fed by the pulse signal of a pulse generator. A feedback signal of the first parameter from the monitor to the power amplifier effects the regulation of the parameter through the controllable switch. The pulse generator produces a periodic train of pulses with a duration short with respect to the time between pulses.

In an alternative application of the invention, the preferred embodiment provides an indication of the charge remaining in a battery on a meter having three ranges of battery condition information. The first range is an expanded scale voltmeter for the battery and is active while the battery is nearly fully charged. The second range indicates the battery's internal resistance as calibrated in terms of remaining charge when the battery is nearing a discharge state. The third range indicates that the battery is neither nearing discharge nor nearly fully charged.

The objects and features of the present invention will best be understood from a detailed description of the preferred embodiments of the invention selected for purposes of illustration and shown in the accompanying drawings in which.

DETAILED DESCRIPTION OF THE PREFERRED EMBODIMENT

Figure 1:
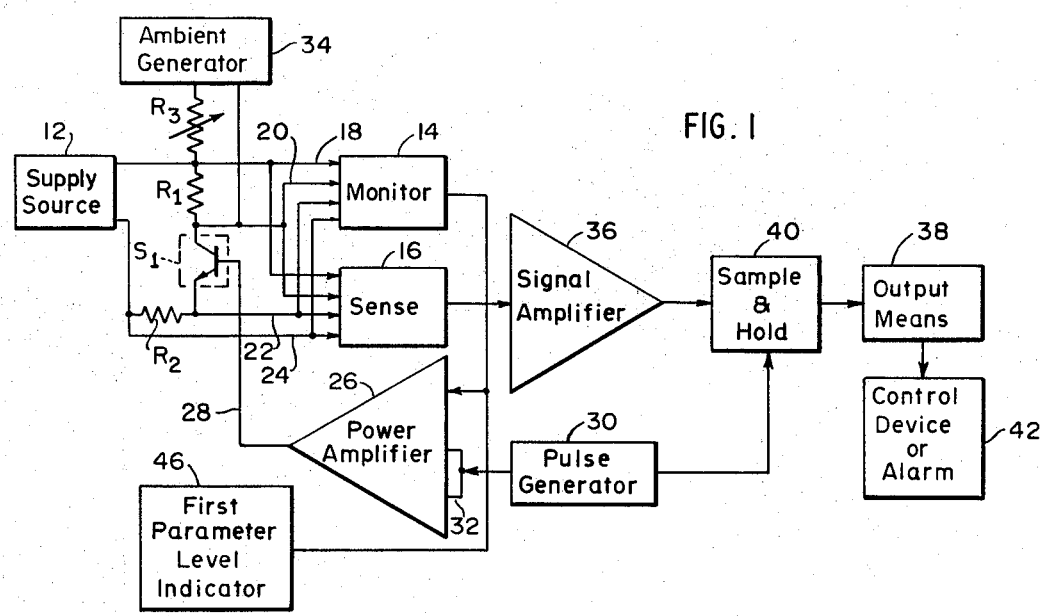
FIG. 1 is a block diagram and partial schematic diagram of the preferred circuitry for accomplishing the resistance measurement of the invention.

Turning now to the drawings and in particular to the circuitry of FIG. 1, there is shown an element R1 which is an element of an electrical apparatus whose resistance it is desired to measure. A circuit is shown conducting electricity from a supply source 12 through element R1, a controllable switch S1, a resistor R2, and back to the supply source 12. To measure the resistance the element R1 is supplied with a pulse of electrical energy from the supply source 12 by causing the controllable switch S1 to conduct briefly. Ohm's law states that the resistance of element R1 will be the quotient of the voltage across the element R1 and the current through it.

Both voltage and current are parameters which must be known before the resistance of the element R1 can be determined. Two variables or parameters must be measured. The parameters measured need not be voltage and current directly but may be parameters which relate to voltage and current so that the voltage and current may be determined from the two parameters. For the preferred embodiment described here, the two parameters are voltage and current, but there is no reason why power dissipated in the element R1 cannot be substituted as one of the parameters.

In order to eliminate simultaneous variations in both parameters, the circuitry of FIG. 1 is designed to maintain one parameter constant while the other parameter is sensed. The second parameter can in this way be calibrated in terms of resistance. A monitor circuit 14 in FIG. 1 is used to monitor a first parameter which it is desired to maintain constant, and a sense circuit 16 is used to sense another or second parameter.

One set of sense leads, lines 18 and 20 is connected across the element R1 and thus have across them a voltage difference equal to the voltage across the element R1. Another set of sense leads, lines 22 and 24, is connected across the resistor R2 and have across them a voltage proportional to the current through the element R1. Resistor R2 is a standard resistance that remains constant and thereby generates a voltage proportional to the current through the element R1.

Lines 18, 20, 22, and 24 are all fed to both the monitor 14 and the sense circuit 16. If current is the parameter to be regulated and voltage is the parameter to be sensed, the monitor 14 receives the signal on lines 22 and 24 and rejects the signal on lines 18 and 20 while the sense circuit 16 receives the voltage signal on lines 18 and 20 but rejects the signal on lines 22 and 24. If the regulated and sensed parameters are reversed then the monitor 14 and sense circuit 16 receive and reject the opposite set of signals. If one of the parameters is power, than both sets of sense leads must be received by both the monitor 14 and sense circuit 16.

High input impedances in monitor 14 and sense circuit 16 limit the current in lines 18, 20, 22, and 24 so that there is little signal loss on these lines between either R1 or R2 and the monitor 14 or sense circuit 16.

Supply source 12 provides the power to drive the pulse of electric energy through the resistive element R1 and standard resistance R2 in series. Controllable switch S1 completes the circuit including supply source 12 and resistances R1 and R2. The amount of current which controllable switch S1 passes through this circuit is determined by the output of power amplifier 26 along line 28. The output of power amplifier 26 is an amplification of a periodic pulse signal which was produced by a pulse generator 30.

During the pulse state, when the switch S1 is made to conduct, voltage or current feedback from monitor 14 to power amplifier 26 provides voltage or current regulation for the pulse or energy which switch S1 allows to be conducted through R1 and R2. The feedback keeps the first parameter constant during the pulse state of this system. Additional pulse shaping circuitry 32 can be added to the power amplifier 26 to insure that the pulse shape is rectangular. During an ambient state which occurs in the interval between pulses no energy is supplied by source 12 to the R1, R2, and S1 circuit because the absence of a pulse from power amplifier 26 to switch S1 keeps switch S1 open.

During this interval between pulses, however, electrical energy may be still flowing through resistive element R1 from another energy source, shown as ambient generator 34, through a second circuit including a varying electrical load, shown as resistance R3. Since during this ambient state there is the possibility of a current through element R1, there is a corresponding possibility of there being a voltage across element R1. This ambient state voltage across element R1 continues during the pulse state and if it is not zero, it must be accounted for during the pulse state in the signals received by the monitor 14 and sense circuit 16.

In the case where the first parameter is the voltage across element R1 on lines 18 and 20, the monitor 14 must generate as the first parameter feedback signal to power amplifier 26 during the pulse state the difference between the pulse state voltage across element R1 and the adjacent ambient state voltage across element R1. When the first parameter detected by the monitor 14 is the current through the circuit composed of R1, R2, and S1, there is no ambient state current through R2 and the monitor 14 is not required to find a difference. Likewise, when the second parameter detected by sense circuit 16 is the voltage across lines 18 and 20, the sense circuit 16 must subtract or eliminate the adjacent ambient state voltage from the pulse state voltage.

A convenient way to difference the ambient state and pulse state voltage for the first and second parameters is to use an A.C. input for the monitor 14 and the sense circuit 16. In this way only the pulse portion of the first and second parameters is passed by the monitor 14 and the sense circuit 16. Because the pulse duration is short compared to the time interval between pulses, a rectangular shape for the pulse can be maintained by suitable time constants in the A.C. inputs while the ambient state voltages are rejected.

Figure 2:
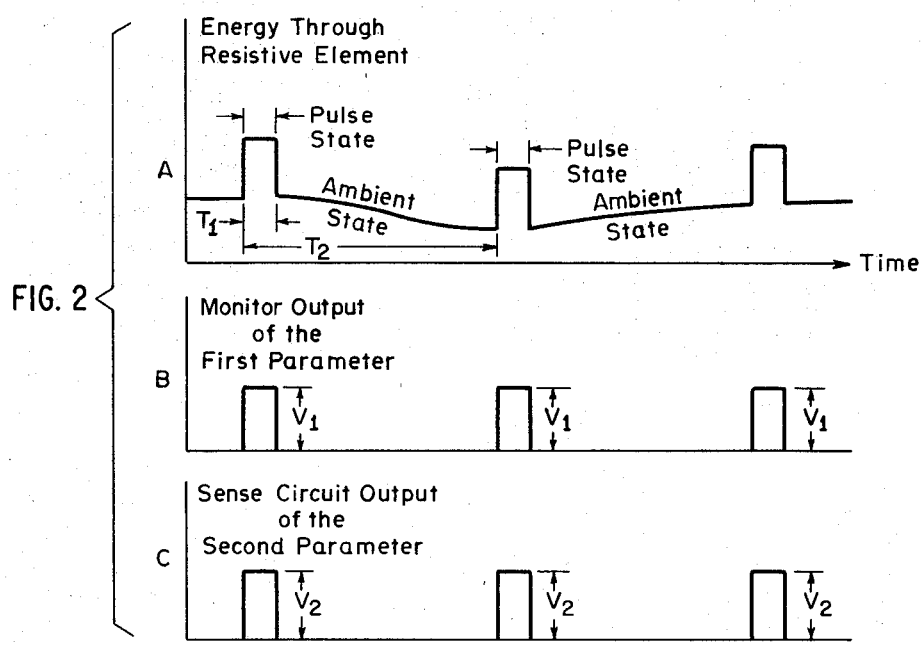
FIGS. 2A–2C are wave form diagrams showing respectively, the pulse and ambient energy levels, first parameter signal level, and second parameter signal level.

By referring now to FIGS. 2A–2C, the inputs and outputs of the monitor 14 and the sense circuit 16 can be better understood. FIG. 2A shows the energy through the resistive element R1 contributed by the supply source 12 and the ambient generator 34. What appears in the end result is a rectangular pulse of energy having a controlled or regulated first parameter superimposed upon a slowly varying ambient level of energy through the element R1. The duration, T1, of the pulse state is typically very short in comparison to the time, T2, between pulses as shown in FIG. 2A. Ratios of T2 to T1 up to 1,000 are characteristic of this circuit. Ten milleseconds is characteristic for the duration of the pulse state, T1. This gives a pulse short enough to conserve energy, but one long enough to avoid capacitive or inductive effects of high power carrying equipment or storage batteries.

Figure 3:
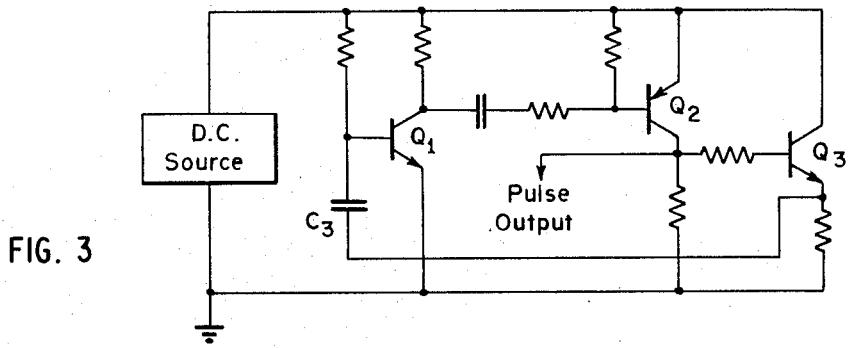
FIG. 3 shows schematically the pulse generator of FIG. 1.

A ratio of T2 to T1 as high as 1,000 is readily achieved by the pulse generator 30 when constructed according to the design of FIG. 3. FIG. 3 shows a schematic diagram for such an astable multivibrator. Transistors Q1 and Q2 operate as the two transistors in a normal astable multivibrator with the base voltage on Q1 determined by the voltage across a timing capacitor C3 connected to the base of Q1. The other end of C3 would normally go to Q2 to allow current to be passed through Q2, C3, and Q1 to a ground point to change the voltage across C3 during the pulse state. The voltage on the timing capacitor C3 must change much faster during the pulse state than during the ambient state, however, in order to make the pulse state as much as 1/1,000 as long as the ambient state. This faster voltage change is made possible by the inclusion of an additional transistor, Q3, which current amplifies the pulse output from Q2 to allow enough current flow through Q3, C3, and Q1 to ground to rapidly alter the voltage across C3.

The maximum amount of energy in each pulse is limited by the energy that the supply source 12 can provide and the heat that can be tolerated in the element R1 and in resistance R2, switch S1 and supply source 12. By making the ratio of T2 to T1 very high and T1 as short as possible the pulse power can be made very high for a given pulse energy without dissipating enough energy or average power in the element or system to cause heating or require a costly supply source. The high pulse power allows a larger second parameter response of the element and thus increases the system's sensitivity.

FIG. 2B shows the first parameter output of the monitor 14 after the ambient state portion of the first parameter, if it exists, is eliminated. FIG. 2C shows the second parameter output of the sense circuit 16 also after the ambient state portion, if it exists, is eliminated.

The output of the sense circuit 16 is a signal proportional to the second parameter as received by the sense circuit 16. Signal amplifier 36 amplifies the output of circuit 16 typically by several orders of magnitude to generate a signal level suitable for operating the indicating devices in an output means 38.

Because the value of the resistance of element R1 is typically milli-or micro-ohms the voltage across R1 will be very small even for large pulse currents. Consequently, when the second parameter is voltage, signal amplifier 36 should be capable of amplifying the second parameter signal by many orders of magnitude. Similarly, when the first parameter is voltage, the monitor 14 should be capable of amplifying the first parameter signal level by many orders of magnitude.

Despite the amplification requirements for the preferred embodiment, it should be apparent that this invention can be used in measuring resistances without having gain in either the monitor 14 or the signal amplifier 36 if the resistances R1 and R2 and the pulsed energy are all large enough to give useable levels of first and second parameters without amplification. It thus should be understood that when amplification is spoken of in reference to amplification of the first and second parameters, the term is used broadly to include situations where unity and fraction amplifications are possible as well as cases requiring amplifications greater than one. In the former two situations, active amplification circuitry is not necessary but attenuation or direct connections can be substituted.

The output of the sense circuit 16 as amplified by the amplifier 36 is incident upon a sample and hold circuit 40. The output of the pulse generator 30 is also fed to the sample and hold circuit 40 so that coincident with the generation of each pulse the sample and hold circuit 40 samples and holds the output of this signal amplifier 36 until the next pulse is received. The sample and hold circuit 40 buffer amplifies the signal value which it holds and outputs it to the output means 38 which may be a meter or any of the devices described below. The output means 38 may also feed the output of the sample and hold circuit 40 to an alarm, recorder or control device 42.

Figure 4:
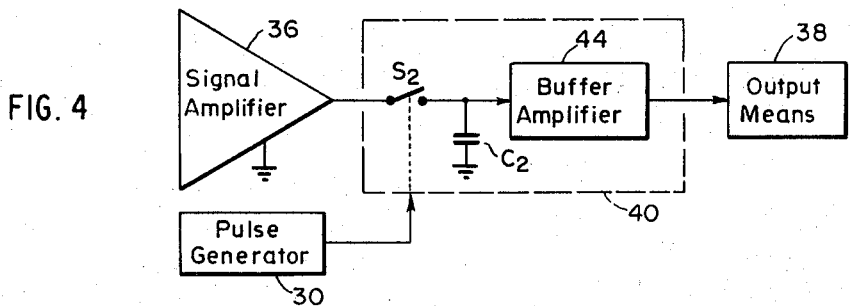
FIG. 4 shows schematically the sample and hold circuitry of FIG. 1.

Referring to FIG. 4 the sample and hold circuit 40 is shown as a switch S2 activated by the pulse from pulse generator 30 to conduct the output of the signal amplifier 36 to a capacitor C2. The switch S2 is closed during the pulse state and the capacitor C2 charges up to the level of the signal output of signal amplifier 11. A buffer amplifier 44 has the signal across capacitor C2 as its input and the buffer amplifier 44 in turn outputs at a low impedance a signal equal to the signal on the capacitor C2 without causing appreciable drain of the capacitor C2. The output of the buffer amplifier 44 is connected to output means 38.

Other ways of achieving a sample and hold function are possible and included as alternatives in this invention. Thus the term sample and hold circuit is used broadly to include any means capable of preserving the difference in the second parameter between the pulse and ambient state. Representative examples of other sample and hold means include peak-reading meters and oscilloscopes with a continuous redisplay capability, photographic image retention means, slow decay phosphor CRT's and/or the quick-eye of the observer or an A-to-D converter indicator.

A first parameter level indicator 46 in FIG. 1 may also be added to the output of the monitor 14. The first parameter level indicator 46 indicates if the proper level for the first parameter is achieved during each pulse state. An indicating device such as a light is provided in level indicator 46 to flash on the occurrence of each pulse only if the first parameter achieves the preset regulated level, indicating proper operation. If the first parameter is current, such an indication is useful where the resistance of the element R1 could get so high that the supply source 12 would be unable to deliver enough current to element R1.

Figure 5:
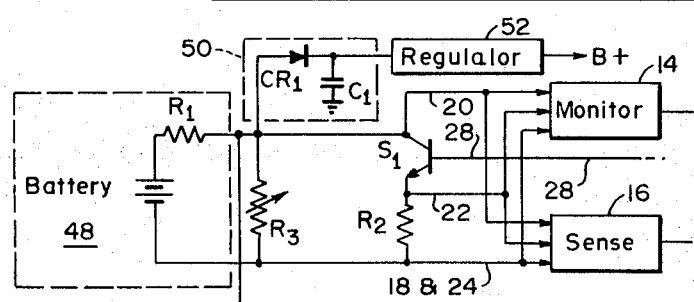
FIG. 5 is a partial block diagram and partial schematic diagram showing a modification of the circuitry of FIG. 1 for measuring battery internal resistance; and, FIG. 6 is a further modification of the circuitry of FIG. 1 as used with the modification of FIG. 5 showing output circuitry for the three range battery condition indicating meter.

Referring to FIG. 5 a preferred wiring arrangement is shown for using the resistance measuring system in conjunction with a battery 48 for measuring the internal resistance of the battery 48. The battery 48 has an internal resistance shown as element R1, the element whose resistance is to be measured. The battery 48 is also shown supplying power to a varying load R3. In this case the battery 48 serves as both the supply source and the ambient generator. A controllable switch S1 and standard resistance R2 are connected in series across the load R3. The sense leads, lines 22 and 24, indicate a voltage across R2 proportional to the current through the controllable switch S1 which current is an additional current through the battery 48 and element R1. The lines 22 and 24 are the same as shown in FIG. 1.

Because the resistive element R1 is distributed throughout the battery 48, the sense leads, lines 18 and 20, include the battery 48 voltage in the voltage across them and lines 18 and 24 become the same. However, since the monitor 14 and the sense circuit 16 can both subtract the ambient state parameter signal from the pulse state parameter signal the presence of a battery voltage as a constant offset is eliminated in the difference.

In the battery resistance measuring circuit of FIG. 5 the pulse drive on line 28 to controllable switch S1 effectively produces an increased load on the battery 48 for the duration of the pulse state. Either the increased battery current or the battery voltage change or their product can be regulated depending upon which signal or signals are received by the monitor 14 and the sense circuit 16, as described above.

By taking the output of the battery 48 through a low-pass filter 50 composed of series resistance in a diode CR1 and shunt capacitance in capacitor C1 as shown in FIG. 5, the battery may be used as the power source for the resistance measuring system. The R-C low-pass filter decouples the battery from the resistance measuring system for pulses of the speed and level that are used in taking the measurement and the diode CR1 prevents the reverse flow of current. In addition regulator 52 may be added after the R-C filter to increase the decoupling and insure the constancy of the supply voltage for the resistance measuring system.

Figure 6:
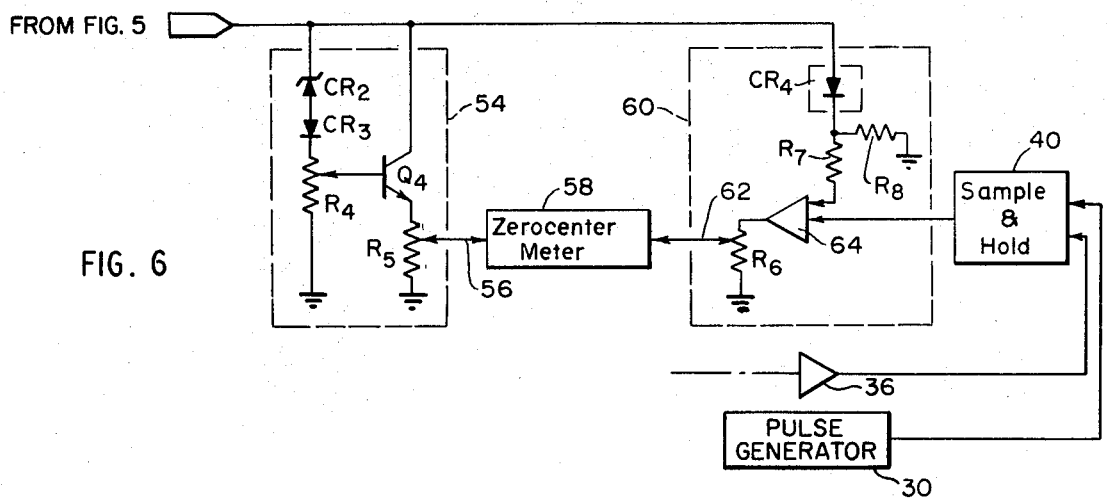

Referring to FIG. 6 there is shown a detailed schematic diagram of the output means 38 for using the resistance measuring system as a battery fuel gauge. A scale expanding circuit 54 is connected across the battery 48 and provides at an output point on line 56 a signal which varies linearly with the voltage on the battery 48 when the battery voltage is above a preset level, and is zero for battery voltage below that preset level. The line 56 voltage is below the battery voltage by the amount of the preset level when the battery voltage is above the preset level. The scale expanding circuit 54 operates by passing the battery voltage through a zener diode CR2, forward diode CR3, potentiometer R4 and buffer emitter-follower Q4.

The preset level is chosen such that for a battery which is nearly fully charged the output voltage of the battery will exceed that preset level for all expected load conditions. Thus, the signal level on line 56 will be non-zero during the period when the battery is nearly fully charged.

Line 56 is connected to one terminal of a zero center meter 58, with the other terminal of the meter fed from an output point of an amplifier circuit 60 on line 62. The amplifier circuit 60 is driven by the sample and hold circuit 40. Electric current will flow through the meter 58 between the lines 56 and 62 according to their relative signal levels. Resistors R5 and R6 from lines 56 and 62 respectively to ground provide return paths for the meter 58 current.

Amplifier circuit 60 is composed of a differential amplifier 64 having the output of the sample and hold circuit 40 as one input and a bias voltage through resistor R7 from diode CR4 and resistor R8 acting as a undirectional potentiometer to a differential input.

During the first period of use of the battery 48 after it has been fully charged the sample and hold circuit 40 will indicate a very low internal resistance with a very low signal level at its output. Consequently, the signal level on line 62 will be very low and current will flow through the meter 58 from line 56 to line 62. The needle of the meter 58 is deflected to one side of the zero center onto a scale where it operates as an expanded scale volt meter.

When the battery 48 is nearly discharged, the signal level on line 56 will be zero since the battery output voltage will be below its preset level. But, the internal resistance of the battery 48 will be high and the signal at the output of the sample and hold circuit 40 will be correspondingly high making the line 62 signal level high with resulting current flowing from line 62 through the meter 58 to line 56. The meter needle is deflected from the zero center position in the opposite direction to a scale calibrated in terms of battery charge remaining.

By suitably biasing the sense circuit 16, signal amplifier 36, sample and hold circuit 40 and/or the amplifier circuit 60 the voltage on line 62 can be kept near zero until the battery resistance begins to increase markedly above a preset resistance level occurring at approximately the last 25 percent of battery charge when the battery is near discharge. The scale expanding circuitry 54 can be made to produce a near zero voltage on line 56 under normal battery load conditions long before the last 25 percent of battery charge is reached. In between these two points the zero center meter 58 will indicate zero but with some jiggling due to circuit noise or variations in load R3. This jiggling indicates that the system is operating and that the battery is neither nearly discharged nor almost fully charged.

As the battery 48 enters its last 25 percent of charge the needle on the zero center meter 58 will slowly walk away from the zero position indicating the battery's progress toward the discharge condition. Suitable calibration points on that scale can be used to indicate the amount of charge left in the battery and whether a fresh battery should be obtained before the equipment being driven by the battery attempts an additional task. The accuracy of the meter reading as an indication of battery charge remaining is guaranteed by the fact that the internal resistance of a battery as indicated on the meter 58 near charge exhaustion is an accurate indication of remaining charge.

These features just described give the meter 58 two distinct non-interactive scales, one for a near discharge condition and the other for a near full charge condition with a zero deflection middle range. Confusion by the operator as to the battery's condition is thereby minimized.

A pulse duration of 10 milleseconds was found to be an advantageous comprise between battery response considerations. A much longer pulse would allow polarization or chemical changes in the battery. A much shorter pulse would be difficult to regulate because of capacitive and inductive effects in the battery.

The signal on line 62 may also be used to excite a number of other devices such as controllers, recorders, or alarm circuits 42 as shown in FIG. 1. For instance, an alarm may be sounded once the signal level on line 62 has exceeded a preset value indicating that complete battery discharge is imminent.

Having described in detail preferred embodiments of our invention, what we desire to claim and secure by Letters Patent of the United States is:

We claim:

1. A low dissipation system for detecting the internal resistance of a battery comprising:
   a. means for switching through said battery a pulse of electrical energy with a regulated Ohm's law related first parameter, said pulse of electrical energy defining a pulse state between adjacent ambient states;
   b. means for sensing a second Ohm's law related parameter which is characteristic of the Ohm's law response of said internal resistance of said battery to the first parameter of said pulse of electrical energy passing through said battery, said second parameter being representative of said battery's internal resistance; and,
   c. sample and hold means for sampling and then holding during the ambient state between pulse states a signal representative of the second parameter response of said battery as sensed by said sensing means during a preceding pulse state.

2. A battery fuel gauge system with a low battery drain for indicating the charge state of a battery comprising:
   a. means for conducting from said battery a pulse of electrical energy with a regulated Ohm's law related first parameter, said pulse of electrical energy defining a pulse state between adjacent ambient states;
   b. means for sensing a second Ohm's law related parameter characteristic of the Ohm's law response of the internal resistance of said battery to the first parameter of said pulse of electrical energy conducted from said battery, said second parameter being representative of said internal resistance; and,
   c. sample and hold means for sampling and then holding during the ambient state between pulse states a signal representative of the second parameter response of said battery as sensed by said sensing means during a preceding pulse state.

3. The system of claim 2 characterized by a varying load being connected across said battery whereby the battery continuously supplies power to the load so that ambient energy continuously passes from said battery.

4. The system of claim 2 further characterized by said battery supplying operating power for said system through a decoupling means, said decoupling means isolating the power supply for the system from the effects of the pulse of electrical energy.

5. The system of claim 2 further characterized by output means coupled to said battery and said sample and hold means for indicating on a first scale of a meter a value representative of said battery's charge in terms of said battery's internal resistance when the signal held by said sample and hold means exceeds a first preset level and indicating on a second scale of a meter said battery's output voltage when it exceeds a second preset level.

6. The system of claim 5 wherein said output means provides means for indicating when the battery's condition is not such as to generate a meter indication in either scale.

7. The system of claim 5 wherein:
   a. said indicating means further includes a meter of the zero center type having said first scale to one side of zero and said second scale to the other side of zero; and
   b. meter scale expanding circuit means connected between said battery and one of said meter terminals, said meter scale expanding circuit means producing a first signal which increases from zero representative of the amount by which said battery's output voltage exceeds said second preset level, and which is substantially non-zero under normal battery load conditions only when said battery is nearly fully charged;
   c. differential amplifier means having a first input coupled to the output of said sample and hold means, a second input coupled to a bias voltage means, and an output coupled to the other terminal of said meter, said differential amplifier producing a second signal which increases from zero representative of the amount by which the signal held by said sample and hold means exceeds said first preset level only and which is substantially non-zero only when said battery is near discharge.

8. The system of claim 7 characterized by:
   a. said battery continuously operating to supply power to a varying load connected across said battery whereby ambient electrical energy continuously passes from said battery; and
   b. said battery supplying operating power for said system through a decoupling means, said decoupling means isolating the power supply for the system from the effects of said pulse of electrical energy.

9. A method of generating an indication of battery charge condition operable with a battery while said battery is in service supplying power to a varying load comprising the steps of:
   a. periodically pulsing a pulse of energy with a regulated Ohm's law related first parameter out of said battery for a pulse duration short with respect to the time between pulses;
   b. sensing a second Ohm's law related parameter which is characteristic of the Ohm's law response of said battery to said pulse during said pulse;
   c. sampling and holding for the interval between pulses, a signal representative of the sensed second parameter response of said battery during a preceding pulse; and,
   d. displaying on a meter an indication of battery charge condition by exciting the meter with the signal sampled and held in said sampling step, said metering, being calibrated in terms of battery charge condition.

10. The method of claim 9 characterized by said displaying step further comprising:
   a. directing current through said meter in a first direction when the signal sampled and held exceeds a preset level therefor, the level of current through said meter in said first direction being representative of the signal stored; and
   b. directing current through said meter in a second direction when the signal sampled and held is below said preset level therefor and said battery's voltage output is above a preset level therefor, the level of current through said meter in said second direction being representative of the amount by which said battery's voltage output exceeds the preset level therefor, said meter being of the zero center type.

11. A battery condition meter comprising:
   a. means for developing a signal representative of a battery's internal resistance;

b. output means for indicating on a first scale of a meter a value representative of said battery's charge in terms of said battery's internal resistance when the signal developed by said developing means exceeds a first preset level, and for indicating on a second scale of a meter, said battery's output voltage when it exceeds a second preset level and the signal developed by said developing means is below the first preset level.

12. The system of claim 11 wherein:
a. said meter is of the zero center type having said first scale to one side of zero and said second scale to the other side of zero; and
b. meter scale expanding circuit means connected between said battery and one of said meter terminals, said meter scale expanding circuit means producing a first signal which increases from zero representative of the amount by which said battery's output voltage exceeds said second preset level, and which is substantially non-zero under normal battery load conditions only when said battery is nearly fully charged;
c. differential amplifier means having a first input coupled to the output of said sample and hold means, a second input coupled to a bias voltage means, and an output coupled to the other terminal of said meter, said differential amplifier producing a second signal which increases from zero representative of the amount by which the signal held by said sample and hold means exceeds said first preset level and which is substantially non-zero only when said battery is near discharge.

* * * * *